J. SELIG.
PLATE LIFTER.
APPLICATION FILED AUG. 3, 1917.
1,255,056.
Patented Jan. 29, 1918.
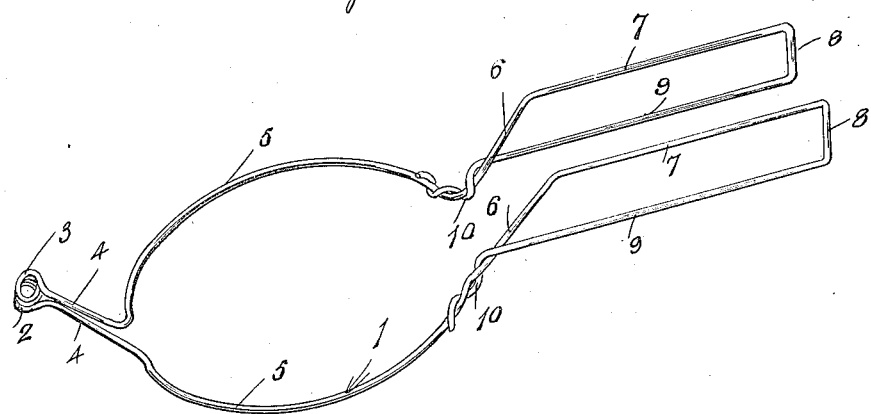
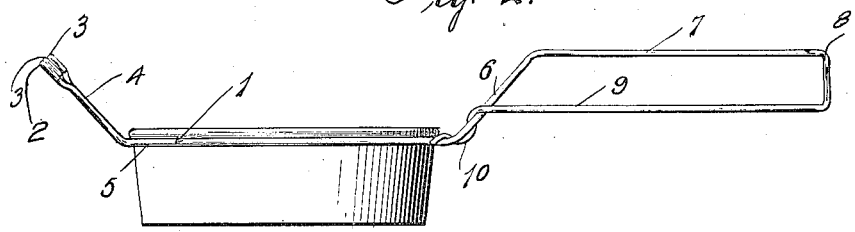
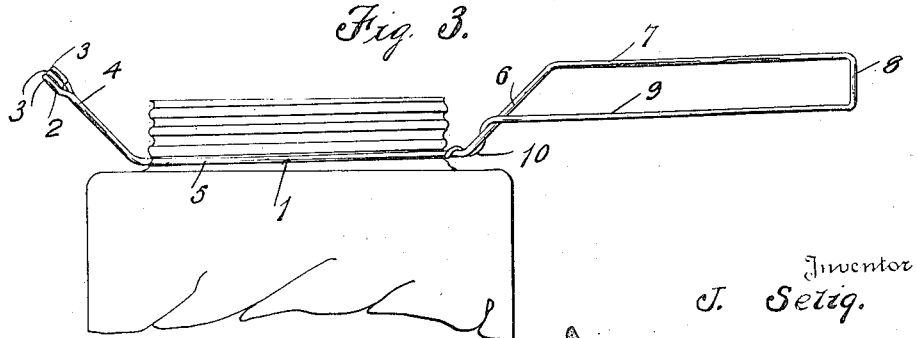

UNITED STATES PATENT OFFICE.

JOHN SELIG, OF PICKERING, LOUISIANA.

PLATE-LIFTER.

1,255,056.　　　　Specification of Letters Patent.　　Patented Jan. 29, 1918.

Application filed August 3, 1917. Serial No. 184,272.

*To all whom it may concern:*

Be it known that I, JOHN SELIG, a citizen of the United States, residing at Pickering, in the parish of Vernon and State of Louisiana, have invented certain new and useful Improvements in Plate-Lifters; and I do hereby declare the following to be a full, clear, and exact description of the invention, such as will enable others skilled in the art to which it appertains to make and use the same.

This invention relates to improvements in plate lifters.

The object of this invention is to provide a device comprising resilient plate engaging members, which permit them to fit under the flange of a plate or pan of any configuration, thus permitting the plate, pan or the like to be lifted from the stove or other support.

A further object of this invention is to provide a device capable of being applied to bowls, glass fruit jars or the like articles as it is self adjustable and will easily conform to the configuration of any article so that the article may be readily and quickly lifted.

A further object of this invention is to provide a pan or bowl lifter formed from a single length of wire and so constructed as to be readily adjusted to conform to the configuration of the article to which it is applied so that the device may be readily and quickly lifted from a heated stove or the like.

A still further object of this invention is to provide a pair of substantially semi-circular clamping members, which are resiliently connected together and handles formed integrally with the clamping members and spaced therefrom by spacing members, obviating the burning or injuring of the operator's hand during the lifting action.

A still further object of this invention is to provide a pan lifter of this character, which will be simple, practical and comparatively inexpensive in construction, and one that can be manufactured and sold at a low cost.

With these and other objects in view, the invention consists in the novel combination and arrangement of parts hereinafter more fully described and set forth in the claim hereto appended.

In the drawings:

Figure 1 is a perspective view of my improved plate lifter as made in accordance with my invention, Fig. 2 is a side elevation of the same applied to the flange of a pan, Fig. 3 is a side elevation illustrating the pan or plate lifter applied to an ordinary fruit jar.

Like numerals of reference designate corresponding parts in all the figures of the drawings.

Referring to the drawings, the numeral 1 designates the pan or plate lifter in its entirety and it is constructed of a single length of wire or other suitable material, suitable for the purpose.

The wire is looped at its medial portion as at 2 to provide a plurality of superposed convolutions 3, which constitutes means whereby the device may be suspended from a support. The terminals of the convolutions are bent downwardly and inclined rearwardly to provide the spaced parallel resilient arms 4. The ends of the arms are curved laterally in opposite directions to provide a pair of diametrically opposed substantially semi-circular clamping members 5. The clamping members 5 are adapted to be arranged in a horizontal plane and may be adjusted to conform to the configuration of any ordinary pan, jar or the like due to the resilient action of the convolutions 3 at the medial portion of the wire. The ends of the clamping members 5 are inclined upwardly to provide the spacing members 6, which are arranged in spaced relation to each other and have their terminals extended rearwardly in a horizontal plane to provide the bars 7. The bars 7 have their terminals bent downwardly at right angles thereto as at 8 and extended forwardly to provide the bars 9, which are arranged in spaced parallel relation to the bars 7 and in a plane beneath the same.

The bars 9 and 7 constitute handles to facilitate the arranging of the clamping members 5 about a jar, plate, pan or the like. The ends of the bars 9 are twisted about the spacing members 6 as at 10 to increase the rigidity and strengthen the handles constituted by the bars 7 and 9 respectively.

It will be noted that by virtue of the spacing members 4 and 6 a person may readily grasp the handles 7 and loop 3 in each of the hands without fear of burning the hands during the lifting of the heated article.

It is also to be noted by virtue of the convolutions 3 that the clamping members are self adjustable and may readily conform to the configuration of any ordinary pan, jar or the like and may be quickly and readily clamped thereto by pressing the bars 7 and 9 of each handle toward one another.

What is claimed is:

A pan lifter formed of a single length of wire looped at its medial portion to provide a pair of spaced downwardly inclined arms, the terminals of the arms curved outwardly and inwardly to provide a pair of resilient clamping members, the terminals of the clamping members inclined upwardly to provide spacing members and the terminals of the spacing members forming handles, the terminals of the handles wrapped about the spacing members and clamping members to reinforce the same, said spacing members permitting the operator to readily position the clamping members about a pan.

In testimony whereof I affix my signature in presence of two witnesses.

JOHN SELIG.

Witnesses:
WILMER CAIN,
ISLA GREENE.